US012791717B2

(12) United States Patent
Jeong et al.

(10) Patent No.: US 12,791,717 B2
(45) Date of Patent: Nov. 10, 2026

(54) VEHICLE LiDAR SYSTEM AND OBJECT DETECTING METHOD THEREOF

(71) Applicants: Hyundai Motor Company, Seoul (KR); Kia Corporation, Seoul (KR)

(72) Inventors: Mu Gwan Jeong, Seoul (KR); Nam Gyun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 824 days.

(21) Appl. No.: 18/071,217

(22) Filed: Nov. 29, 2022

(65) Prior Publication Data

US 2023/0194721 A1 Jun. 22, 2023

(30) Foreign Application Priority Data

Dec. 17, 2021 (KR) ........................ 10-2021-0181796

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
CPC ...... G01S 17/89; G01S 17/931; G01S 7/4808; G01S 7/4802
See application file for complete search history.

(56) References Cited

U.S. PATENT DOCUMENTS

| | | | |
|---|---|---|---|
| 2018/0074203 A1 | 3/2018 | Zermas et al. | |
| 2020/0249326 A1 | 8/2020 | Bhaskaran et al. | |
| 2020/0401817 A1* | 12/2020 | Schroeter | G06T 7/50 |
| 2022/0107391 A1* | 4/2022 | Ren | G06V 20/58 |
| 2022/0171061 A1* | 6/2022 | Kim | G01S 17/89 |

FOREIGN PATENT DOCUMENTS

| | | | | | |
|---|---|---|---|---|---|
| CN | 110780305 A | * | 2/2020 | G01S 17/02 |
| CN | 113762310 A | | 12/2021 | |
| CN | 113762310 B | * | 7/2024 | G06F 18/241 |
| KR | 20200094384 A | | 8/2020 | |
| WO | WO-2022102476 A1 | * | 5/2022 | G06T 17/20 |

OTHER PUBLICATIONS

Yang, Haozhe, et al. “Two-layer-graph clustering for real-time 3D LiDAR point cloud segmentation.”Â Applied SciencesÂ 10.23 (2020): 8534.

Bogoslavskyi, Igor, and Cyrill Stachniss. “Efficient online segmentation for sparse 3D laser scans.” Â PFGâ€ Journal of Photogrammetry, Remote Sensing and Geoinformation ScienceÂ 85.1 (2017): 41-52.

* cited by examiner

*Primary Examiner* — John E Breene
(74) *Attorney, Agent, or Firm* — Fox Rothschild LLP

(57) ABSTRACT

An object detecting method of a vehicle LiDAR system may be disclosed. The object detecting method includes generating an overhead cluster corresponding to an object whose height from the ground may be equal to or larger than a reference height and a grounded cluster whose height from the ground may be smaller than the reference height, in point cloud data obtained by sensing an object; and comparing point data included in the overhead cluster and point data included in the grounded cluster, and removing the grounded cluster upon determining that an object corresponding to the corresponding grounded cluster does not exist.

16 Claims, 12 Drawing Sheets

VEHICLE LiDAR SYSTEM AND OBJECT DETECTING METHOD THEREOF

PRIORITY

The present application claims under 35 U.S.C. § 119(a) the benefit of Korean Patent Application No. 10-2021-0181796, filed on Dec. 17, 2021, which is hereby incorporated by reference as if fully set forth herein.

BACKGROUND OF THE DISCLOSURE

Field of the Disclosure

The present disclosure relates to a vehicle LiDAR system and an object detecting method thereof.

Discussion of the Related Art

LiDAR (Light Detecting And Ranging) has been developed in the form of constructing topographic data for constructing three-dimensional GIS (geographic information system) information and visualizing the topographic data. A LiDAR system may estimate the position of a vehicle by using a point cloud obtained through a LiDAR sensor, and may assist in a driving function by obtaining information on objects around the vehicle.

If information on an object recognized using the LiDAR sensor may be inaccurate, reliability of autonomous driving may decrease, and the safety of a driver may be jeopardized. Thus, research to improve the accuracy of detecting an object has continued.

SUMMARY OF THE DISCLOSURE

An object of the present disclosure may be to provide a vehicle LiDAR system and an object detecting method thereof, capable of accurately recognizing an object by minimizing the influence of crosstalk in which point data may be generated in a region where an object does not actually exist, when an object with high reflectivity may be sensed using a LiDAR sensor.

It may be to be understood that technical objects to be achieved by embodiments may not be limited to the aforementioned technical objects and other technical objects which may not be mentioned herein will be apparent from the following description to one of ordinary skill in the art to which the present disclosure pertains.

To achieve the objects and other advantages and in accordance with the purpose of the disclosure, an object detecting method of a vehicle LiDAR system may include: generating an overhead cluster corresponding to an object whose height from the ground may be equal to or larger than a reference height and a grounded cluster whose height from the ground may be smaller than the reference height, in point cloud data obtained by sensing an object; and comparing point data included in the overhead cluster and point data included in the grounded cluster, and removing the grounded cluster upon determining that an object corresponding to the corresponding grounded cluster does not exist.

For example, the comparing of the point data included in the overhead cluster and the point data included in the grounded cluster and the removing of the grounded cluster upon determining that an object corresponding to the corresponding grounded cluster does not exist may include: determining, when point data included in the overhead cluster may be also included in the grounded cluster, that an object corresponding to the corresponding grounded cluster does not exist.

For example, the generating of the overhead cluster corresponding to an object whose height from the ground may be equal to or larger than the reference height and the grounded cluster whose height from the ground may be smaller than the reference height, in the point cloud data obtained by sensing the object, may include: generating a mesh graph on the basis of connectivity of points included in the point cloud data; selecting an arbitrary point existing at a height equal to or larger than the reference height in the mesh graph, as a seed point; sequentially connecting adjacent points on the mesh graph starting from the seed point; and assigning the same overhead point ID for points connected with the seed point.

For example, the generating of the mesh graph on the basis of the connectivity of the points included in the point cloud data may include: selecting one arbitrary seed point, and searching two points adjacent to the seed point in a vertical direction; checking whether a distance of the two points adjacent in the vertical direction may be equal to or smaller than a vertical reference distance; and determining, when the distance of the two points may be equal to or smaller than the vertical reference distance, that the two points have vertical connectivity, and generating the mesh graph.

For example, the generating of the mesh graph on the basis of the connectivity of the points included in the point cloud data may include: selecting one arbitrary seed point, and searching two points adjacent to the seed point in a horizontal direction; checking whether a distance of the two points adjacent in the horizontal direction may be equal to or smaller than a horizontal reference distance; determining, when the distance of the two points may be equal to or smaller than the horizontal reference distance, whether the two points satisfy a convex angle; and determining, when the convex angle may be satisfied, that the two points have horizontal connectivity, and generating the mesh graph.

For example, the object detecting method may further include: generating the overhead cluster by grouping points assigned the same overhead point ID.

For example, the generating of the overhead cluster corresponding to an object whose height from the ground may be equal to or larger than the reference height and the grounded cluster whose height from the ground may be smaller than the reference height, in the point cloud data obtained by sensing the object, may include: setting a grid map for the point cloud data obtained by sensing the object; grouping points according to a predetermined rule on the basis of the grid map; and generating the grounded cluster according to a grouping result.

For example, the comparing of the point data included in the overhead cluster and the point data included in the grounded cluster and the removing of the grounded cluster upon determining that an object corresponding to the corresponding grounded cluster does not exist may include: selecting one arbitrary point among overhead points included in the overhead cluster, as a seed point; searching a mesh graph starting from the seed point; updating points included in the searched mesh graph; checking whether there may be a point included in the grounded cluster, among the points; and determining, when there may be a point included in the grounded cluster, that an object corresponding to the corresponding grounded cluster does not exist.

For example, the object detecting method may further include: determining whether the grounded cluster satisfies a preset removal condition; and removing, when the removal condition may be satisfied, the corresponding grounded cluster.

For example, the determining of whether the grounded cluster satisfies the preset removal condition may include: not removing and maintaining the grounded cluster when the corresponding grounded cluster exists within a preset valid range and exists at a position lower than a removal reference height.

For example, the object whose height from the ground may be equal to or larger than the reference height may include a road traffic sign.

In another embodiment of the present disclosure, a computer-readable recording medium recorded with a program for executing an object detecting method of a vehicle LiDAR system may implement: a function of generating an overhead cluster corresponding to an object whose height from the ground may be equal to or larger than a reference height and a grounded cluster whose height from the ground may be smaller than the reference height, in point cloud data obtained by sensing an object; and a function of comparing point data included in the overhead cluster and point data included in the grounded cluster, and removing the grounded cluster upon determining that an object corresponding to the corresponding grounded cluster does not exist.

In still another embodiment of the present disclosure, a vehicle LiDAR system may include: a LiDAR sensor configured to sense an object, and output point cloud data; and a LiDAR signal processing device configured to generate, in point cloud data, an overhead cluster corresponding to an object whose height from the ground may be equal to or larger than a reference height and a grounded cluster whose height from the ground may be smaller than the reference height, compare point data included in the overhead cluster and point data included in the grounded cluster, and remove the grounded cluster upon determining that an object corresponding to the corresponding grounded cluster does not exist.

For example, the LiDAR signal processing device may include: a segmenting section configured to generate a mesh graph on the basis of connectivity of points included in the point cloud data, select an arbitrary point existing at a height equal to or larger than the reference height in the mesh graph, as a seed point, sequentially connect adjacent points on the mesh graph starting from the seed point, and assign the same overhead point ID for points connected with the seed point; a first clustering section configured to set a grid map for the point cloud data, and generate the grounded cluster according to a preset rule; a second clustering section configured to group points assigned with the same overhead point ID, and generate the overhead cluster; and an error correcting section configured to compare the point data included in the overhead cluster and the point data included in the grounded cluster, and remove the grounded cluster upon determining that an object corresponding to the corresponding grounded cluster does not exist.

For example, the segmenting section may be configured to select one arbitrary seed point and search two points adjacent to the seed point in a vertical direction, may be configured to check whether a distance of the two points adjacent in the vertical direction may be equal to or smaller than a vertical reference distance, and may be configured to determine, when the distance of the two points may be equal to or smaller than the vertical reference distance, that the two points have vertical connectivity; and the segmenting section may be configured to select another arbitrary seed point and search two points adjacent to the seed point in a horizontal direction, may be configured to check whether a distance of the two points adjacent in the horizontal direction may be equal to or smaller than a horizontal reference distance, may be configured to determine, when the distance of the two points may be equal to or smaller than the horizontal reference distance, whether the two points satisfy a convex angle, and may be configured to determine, when the convex angle may be satisfied, that the two points have horizontal connectivity and generates the mesh graph.

For example, the error correcting section may be configured to select one arbitrary point among overhead points included in the overhead cluster, as a seed point, may search a mesh graph starting from the seed point, may be configured to update points included in the searched mesh graph, may be configured to check whether there may be a point included in the grounded cluster, among the points, and may be configured to determine, when there may be a point included in the grounded cluster, that an object corresponding to the corresponding grounded cluster does not exist.

In the vehicle LiDAR system and the object detecting method thereof according to the embodiments, when clustering overhead points obtained from an overhead object with high reflectivity and a height from the ground equal to or larger than a reference, by removing clusters determined to be erroneously generated due to a crosstalk effect by a reflected signal, it may be possible to improve recognition accuracy for an overhead object such as a road sign.

In addition, in the vehicle LiDAR system and the object detecting method thereof according to the embodiments, by recognizing objects by clustering, in different ways, overhead points detected from an overhead object and grounded points detected from a grounded object attached to the ground or determined to be attached to the ground, object recognition performance may be maximized within limited system resources.

An exemplary embodiment may include a vehicle comprising the vehicle LiDAR system according to the embodiments described herein.

Effects obtainable from the embodiments may not be limited by the above mentioned effects. Other unmentioned effects may be clearly understood from the following description by those having ordinary skill in the technical field to which the present disclosure pertains.

BRIEF DESCRIPTION OF THE DRAWINGS

FIGS. 11A and 11B are diagrams for explaining a method of removing a crosstalk effect in which FIG. 11B is an exemplary environment and FIG. 11A is the mesh graph that may be generated.

DETAILED DESCRIPTION OF THE DISCLOSURE

Figure 1:
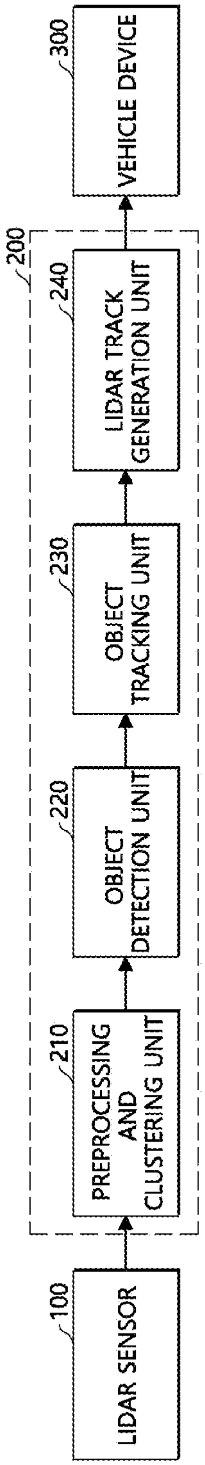
FIG. 1 is a schematic block diagram of a vehicle LiDAR system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments will be apparently described with reference to the annexed drawings and description. However, the embodiments set forth herein may be variously modified, and it should be understood that there may be no intent to limit the present disclosure to the particular forms disclosed, but on the contrary, the embodiments may be to cover all modifications, equivalents, and alternatives falling within the spirit and scope of the present disclosure as defined by the claims. The embodiments may be provided to more completely describe the present disclosure to those skilled in the art.

In the following description of the embodiments, it will be understood that, when each element may be referred to as being formed "on" or "under" another element, it may be directly "on" or "under" the other element or be indirectly formed with one or more intervening elements therebetween.

Further, when an element may be referred to as being formed "on" or "under" another element, not only the upward direction of the former element but also the downward direction of the former element may be included.

In addition, it will be understood that, although the relational terms "first", "second", "upper", "lower", etc. may be used herein to describe various elements, these terms neither require nor connote any physical or logical relations between substances or elements or the order thereof, and may be used only to discriminate one substance or element from other substances or elements.

Throughout the specification, when an element "includes" a component, this may indicate that the element does not exclude another component unless referred to the contrary, but may further include another component. In the drawings, parts irrelevant to the description may be omitted in order to clearly describe the present disclosure, and like reference numerals designate like parts throughout the specification.

In present embodiments, in order to solve a crosstalk problem in which points may be sensed at a position where an object does not actually exist, when recognizing an object with high reflectivity, such as a road sign, by using a LiDAR (Light Detection And Ranging) sensor, clusters determined to be erroneously generated may be removed when clustering point data. Accordingly, it may be possible to improve recognition accuracy for an object with high reflectivity positioned in front of a vehicle, for example, a road sign. In addition, by recognizing objects by clustering, in different ways, points of a region where crosstalk may be expected to occur and points of the other region, object recognition performance may be maximized within limited system resources.

Hereinafter, a vehicle LiDAR system and an object detecting method thereof according to embodiments will be described with reference to the drawings.

FIG. 1 is a block diagram of a vehicle LiDAR system according to an embodiment.

Referring to FIG. 1, the vehicle LiDAR system according to the embodiment may include a LiDAR sensor 100, an object tracking device 200 which processes data obtained from the LiDAR sensor 100 to output object tracking information obtained by tracking a surrounding object, and a vehicle device 300 which controls various functions of a vehicle according to the object tracking information.

After irradiating a laser pulse to an object within a measurement range, by measuring a time during which the laser pulse reflected from the object returns, the LiDAR sensor 100 may be configured to sense information such as a distance to the object, a direction of the object, a speed, and so forth. The object may be another vehicle, a person, a thing, etc. existing outside the vehicle. The LiDAR sensor 100 may be configured to output a sensing result as LiDAR data. The LiDAR data may be outputted in the form of point cloud data composed of a plurality of points for a single object.

The object tracking device 200 may be configured to determine whether an object exists, by receiving the LiDAR data, may recognize the shape of an object, may be configured to track the corresponding object, and may be configured to classify the type of the recognized object. The object tracking device 200 may include a preprocessing and clustering unit 210, an object detection unit 220, an object tracking unit 230, and a LiDAR track generation unit 240.

The preprocessing and clustering unit 210 may be configured to preprocess point data received from the LiDAR sensor 100 into a processable form, and then, may be configured to perform clustering into a meaningful shape unit. The preprocessing and clustering unit 210 may be configured to perform segmentation according to a height at which the point data may be obtained, in the process of preprocessing the point data. The segmentation may be a process of recognizing what type of point each point data is. The preprocessing and clustering unit 210 may be configured to segment a point obtained from an object whose height from the ground may be equal to or larger than a predetermined reference, as an overhead point, and may segment a point detected from an object which may be attached to the ground or may be determined to be attached to the ground, as a grounded point.

The preprocessing and clustering unit 210 may be configured to group point cloud data into a meaningful unit according to a predetermined rule, and generate a cluster as a grouping result. Clustering may mean a process of tying segmented points into points for the same object as much as possible. The preprocessing and clustering unit 210 according to the embodiment may be configured to apply a clustering method on the basis of a mesh graph connection relationship for a region of overhead points, and may be configured to apply a grid-based clustering method for the remaining region including grounded points.

The object detection unit 220 may be configured to generate information on a plurality of boxes by using a clustered result. The object detection unit 220 may be configured to generate a contour using clustered points to determine the shape of an object on the basis of the generated contour. The object detection unit 220 may be configured to detect a box which fits the object, on the basis of the determined shape of the object. Information on a box may include at least one of the width, the length, the position and the heading of a segment box.

The object tracking unit 230 may be configured to select a box associated with the object which may be being tracked, among the plurality of boxes. 'Association' means a process of selecting a box to be used to maintain the tracking of a target object which may be being currently tracked, in the information on the plurality of boxes.

The LiDAR track generation unit 240 may be configured to generate a track according to a target object on the basis of associated boxes, and output the track to the vehicle device 300. Information accumulated before a current time point for the target object which may be tracked, for example, position information and speed information of the target object for each time period, may be preserved as history information. A unit by which, in this way, history information for a unit target object may be preserved may be called a 'channel,' and the number of channels may be the same as the number of tracks.

The vehicle device 300 may be provided with a LiDAR track for each channel from the object tracking device 200, and may apply the LiDAR track to control a driving function.

Figure 2:
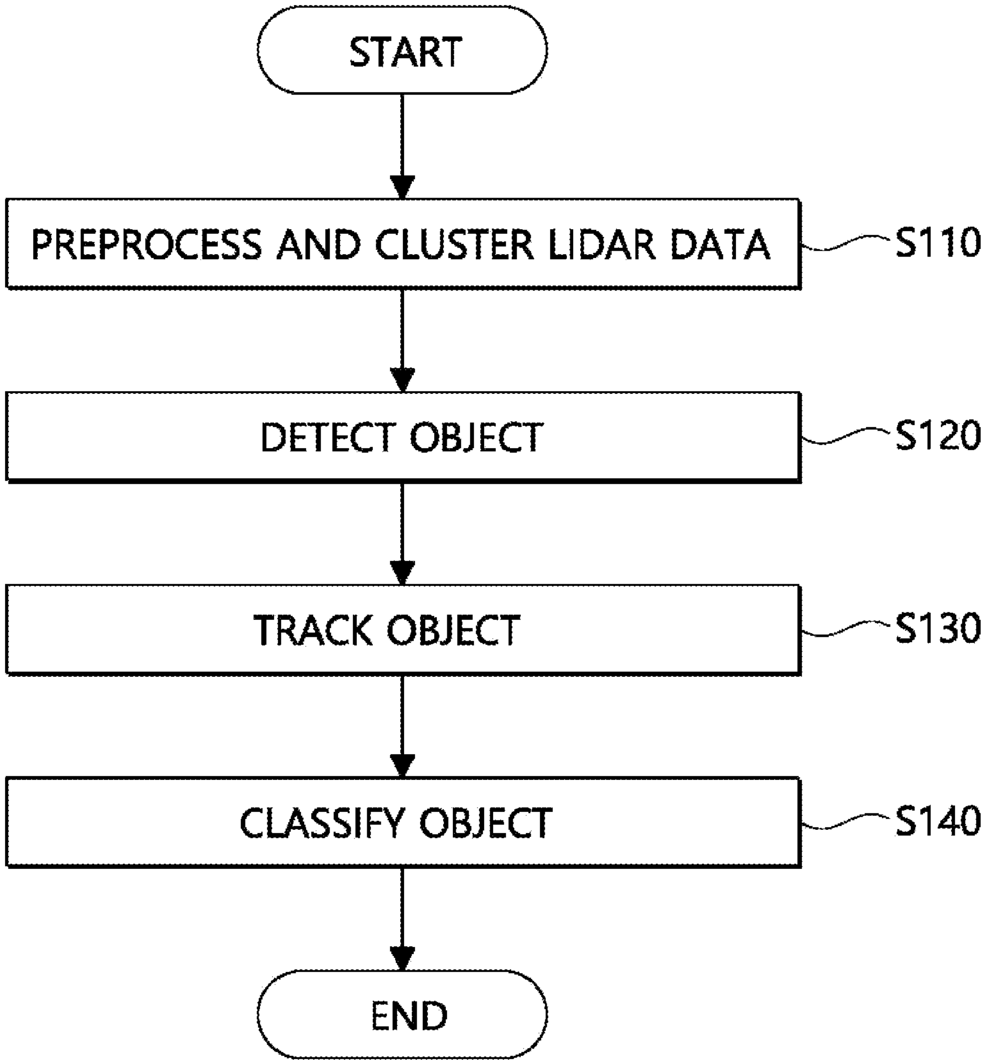
FIG. 2 is a flowchart of an object detecting method of a vehicle LiDAR system according to an embodiment.

FIG. 2 is a flowchart of an object tracking method using a LiDAR sensor according to an embodiment.

The object tracking device 200 preprocesses LiDAR data of a point cloud type, received from the LiDAR sensor 100, into a processable form, and then performs clustering (S110). The preprocessing and clustering unit 210 may perform a preprocessing process of removing grounded data from the LiDAR data, and may cluster the preprocessed LiDAR data into a meaningful shape unit, that is, a point unit of a part considered to be the same object.

An object may be detected on the basis of clustered points (S120). The object detection unit 220 may generate a contour using the clustered points, and may generate and output a box according to the shape of the object on the basis of the generated contour.

The object may be tracked on the basis of the detected box (S130). The object tracking unit 230 selects a box associated with the object which may be being tracked, among a plurality of boxes. 'Association' means a process of selecting a box to be used to maintain the tracking of a target object which may be currently being tracked, in the information on a plurality of segment boxes. Such association may be performed every cycle. The LiDAR track generation unit 240 may generate a track according to a target object on the basis of associated boxes.

The type of the generated LiDAR track may be classified (S140), and may be reflected during driving control. The vehicle device 300 or the object tracking device 200 may classify LiDAR tracks for respective channels into specific objects such as a pedestrian, a guardrail, an automobile and so forth, and then, may apply the LiDAR tracks to control a driving function.

In the above-described object detecting method using a LiDAR sensor, when clustering overhead points obtained from an overhead object with high reflectivity and a height from the ground equal to or larger than a reference, the preprocessing and clustering unit 210 according to the embodiment may remove clusters determined to be erroneously generated due to a crosstalk effect by a reflected signal, thereby improving recognition accuracy for an overhead object such as a road sign.

Figure 3:
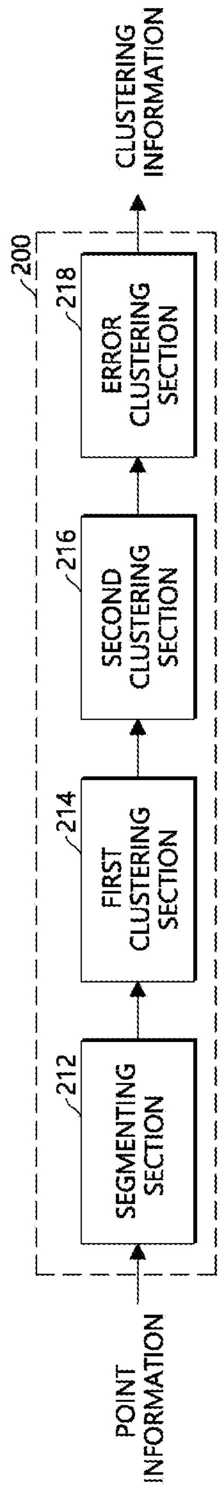
FIG. 3 is a schematic block diagram of a preprocessing and clustering unit of FIG. 1.

FIG. 3 is a schematic block diagram of the preprocessing and clustering unit of FIG. 1.

The preprocessing and clustering unit 210 may include a segmenting section 212, a first clustering section 214, a second clustering section 216 and an error correcting section 218.

The segmenting section 212 checks connectivity between point data for each sensor, connects points having connectivity to each other, and thereby, generates a mesh graph. The segmenting section 212 may determine connectivity between two points, by checking whether the points are adjacent to each other, on the basis of the position, angle, distance, etc. between the points. The segmenting section 212 may generate the mesh graph by checking connectivity for all points and connecting points which are adjacent to each other. After generating the mesh graph, the segmenting section 212 sets an arbitrary point whose height from the ground is equal to or larger than a reference height (th_z_meter) among points constituting the mesh graph, as a seed point, and labels the corresponding point with an ID meaning an overhead object point. The segmenting section 212 labels adjacent points with the same ID in such a manner that a region is gradually grown around the seed point. Through the process described above, the segmenting section 212 may segment overhead points whose heights from the ground are equal to or larger than a predetermined reference.

The first clustering section 214 clusters grounded points detected from an object which is attached to the ground or is determined to be attached to the ground. When clustering grounded points, the first clustering section 214 may apply a grid-based clustering method. A cluster clustered by the first clustering section 214 is referred to as a grounded cluster.

The second clustering section 216 clusters overhead points. When clustering overhead points, the second clustering section 216 may perform clustering on the basis of a mesh graph connection relationship. A cluster clustered by the second clustering section 216 is referred to as an overhead cluster.

The error correcting section 330 may remove a clustering error due to crosstalk. The clustering error due to crosstalk may occur when an object with high reflectivity, which is positioned in front of a vehicle, is sensed. For example, when sensing a road sign installed at a position higher than a vehicle body, a point may be detected even in a region below the road sign where an object does not actually exist, due to a signal reflected on the road sign. Due to this fact, a grounded cluster may be generated in the region below the road sign even though an object does not actually exist. The error correcting section 330 may determine and remove the grounded cluster which is erroneously generated in this way, thereby improving object recognition accuracy.

In the following description, a case of recognizing a road traffic sign with high reflectivity which is installed at an overhead position will be exemplified.

Figure 4:
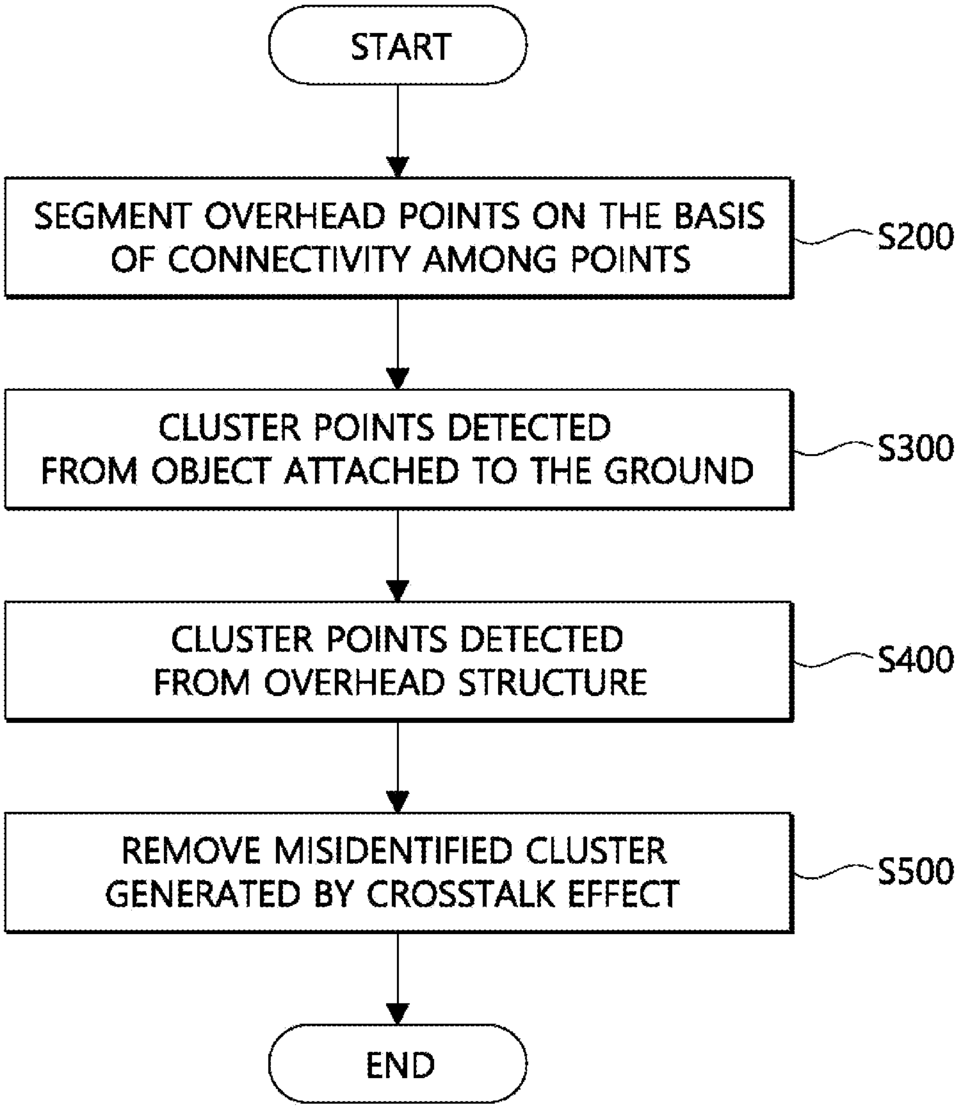
FIG. 4 is a schematic flowchart of a preprocessing and clustering method according to an embodiment.

FIG. 4 is a schematic flowchart of a clustering method according to an embodiment when detecting an object, and FIGS. 5 to 9 are diagrams for explaining respective control steps of FIG. 4.

Referring to FIG. 4, for clustering according to the embodiment, first, a mesh graph is formed by checking connectivity between point data for each sensor and connecting points having connectivity to each other, and then, overhead points detected from an object whose height from the ground is equal to or larger than a reference are segmented (S200).

By grouping grounded points detected from an object which is attached to the ground or is determined to be attached to the ground, a grounded cluster is determined (S300). A grid-based clustering method may be applied for grounded points.

By grouping overhead points, an overhead cluster is determined (S400). A mesh graph-based clustering method may be applied for overhead points.

When clustering is completed, an error due to crosstalk is corrected (S500).

Respective control steps of the clustering method according to the embodiment described above will be described in detail with reference to FIGS. 5 to 9.

Figure 5:
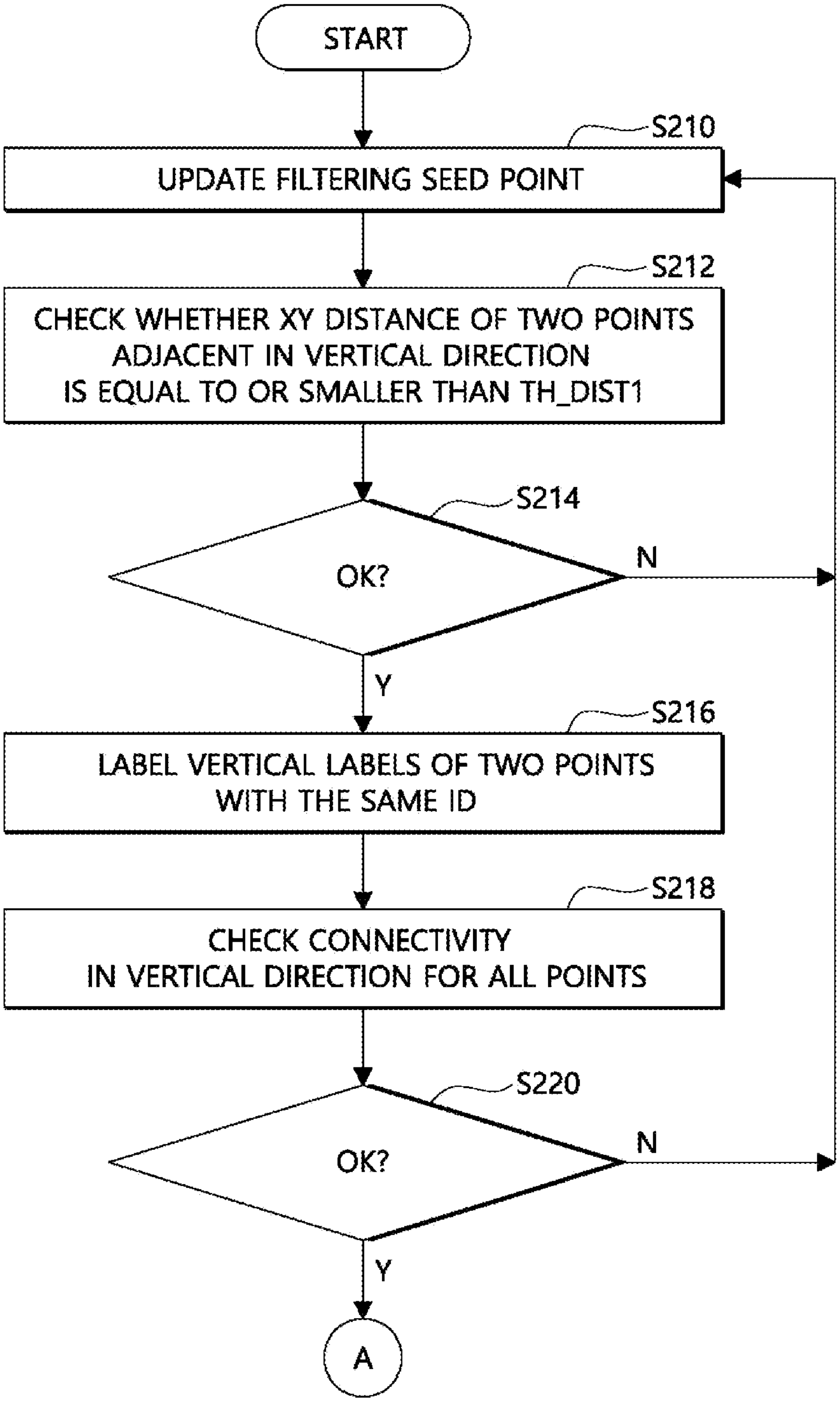
FIGS. 5 and 6 are flowcharts for explaining a method of determining connectivity between points at step S200 of FIG. 4.
Figure 6:
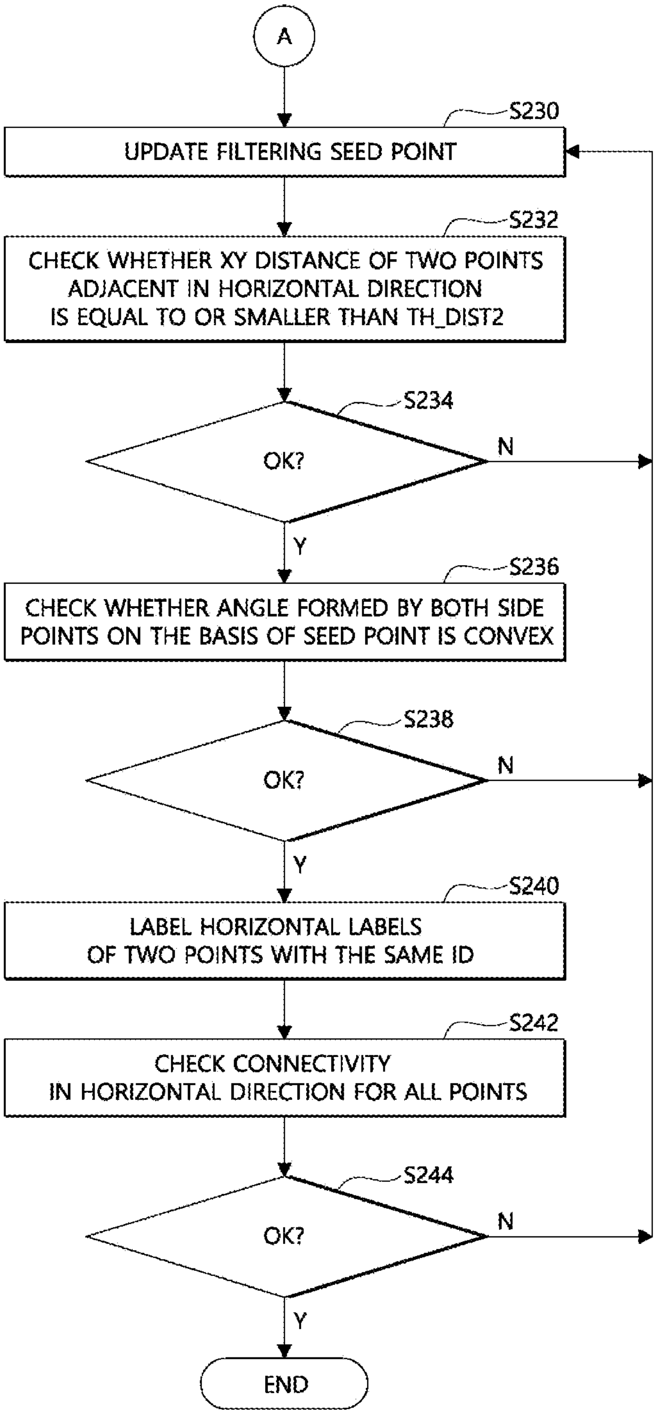

FIGS. 5 and 6 are diagrams for explaining a method of determining connectivity between points at the step S200. The step S200 includes generating a mesh graph by checking connectivity between point data, and segmenting overhead points on the basis of the mesh graph. The mesh graph may be generated as a two-dimensional graph by projecting detected point data on an xy-plane, and is not limited to a specific dimension.

FIG. 5 is a flowchart of a method of checking connectivity in a vertical direction for generating a mesh graph, and FIG. 6 is a flowchart of a method of checking connectivity in a horizontal direction for generating the mesh graph.

Referring to FIG. 5, in order to check connectivity in a vertical direction, a seed point is selected or updated (S210). As the seed point, an arbitrary point may be selected.

When two points that exist adjacent to the seed point in the vertical direction are projected on an xy-plane, it is checked whether the distance between the two points is equal to or smaller than a first reference distance (th-dist1) (S212). The first reference distance (th-dist1) may be set as a value that is variable depending on a distance to a point, the characteristic of a sensor having sensed the point, the characteristic of an object to be detected, and so forth.

It is determined whether the condition that the distance between the two points is equal to or smaller than the first reference distance (th-dist1) is satisfied (S214), and if the condition is not satisfied, the seed point is updated (S210).

When the condition that the distance between the two points is equal to or smaller than the first reference distance (th-dist1) is satisfied, it is determined that the two points have connectivity in the vertical direction, and vertical labels of the two points are labeled with the same ID (S216). That is to say, when an arbitrary seed point and two points existing in the vertical direction are projected on the xy-plane, if the coordinates of the three points do not significantly differ, it may be determined that all of the three points have connectivity in the vertical direction.

By performing the above-described vertical connectivity checking process for all points, vertical label IDs are assigned (S218). When the vertical connectivity checking of all points existing in the vertical direction is completed for one seed point, the same process may be performed by updating the seed point again.

When it is checked that the vertical connectivity checking process is completed for all inputted points (S220), next step Ⓐ of checking connectivity in a horizontal direction is performed.

FIG. 6 is a flowchart of a method of checking connectivity in a horizontal direction, performed after the connectivity checking in the vertical direction is completed.

Referring to FIG. 6, in order to check connectivity in a horizontal direction, a seed point is selected or updated (S230). As the seed point, an arbitrary point may be selected.

When two points that exist adjacent to the seed point in the horizontal direction are projected on an xy-plane, it is checked whether the distance between the two points is equal to or smaller than a second reference distance (th-dist2) (S232).

It is determined whether the condition that the distance between the two points is equal to or smaller than the second reference distance (th-dist2) is satisfied (S234), and if the condition is not satisfied, the seed point is updated (S230).

When the condition that the distance between the two points is equal to or smaller than the second reference distance (th-dist2) is satisfied, it is checked whether the angle formed by points on both sides of the seed point is convex (S236). Convex means a property that, when any two points in a space are selected, a line connecting the two points is necessarily included in the corresponding space.

When the condition that the angle formed by points on both sides of the seed point is convex is satisfied (S238), it is determined that the two points have connectivity in the horizontal direction, and horizontal labels of the two points are labeled with the same ID (S240). That is to say, when an arbitrary seed point and two points existing in the horizontal direction are compared, if the distance between the points is equal to or smaller than the second reference distance (th-dist2) and the angle between the points is parallel, it may be determined that the two points have connectivity in the horizontal direction. The comparison reference such as the second reference distance (th-dist2), the angle and so forth may be set as a value that is variable depending on a distance to a point, the characteristic of a sensor having sensed the point, the characteristic of an object to be detected, and so forth.

It is checked whether the horizontal connectivity checking process for all points is completed (S244). When the horizontal connectivity checking process for all points is not completed, the same process may be performed by updating the seed point again. When the horizontal connectivity checking process for all points is completed, the connectivity checking process is ended.

A mesh graph may be generated according to results of the connectivity checking in the vertical direction and the connectivity checking in the horizontal direction, and overhead points may be segmented on the basis of the mesh graph.

Figure 7:
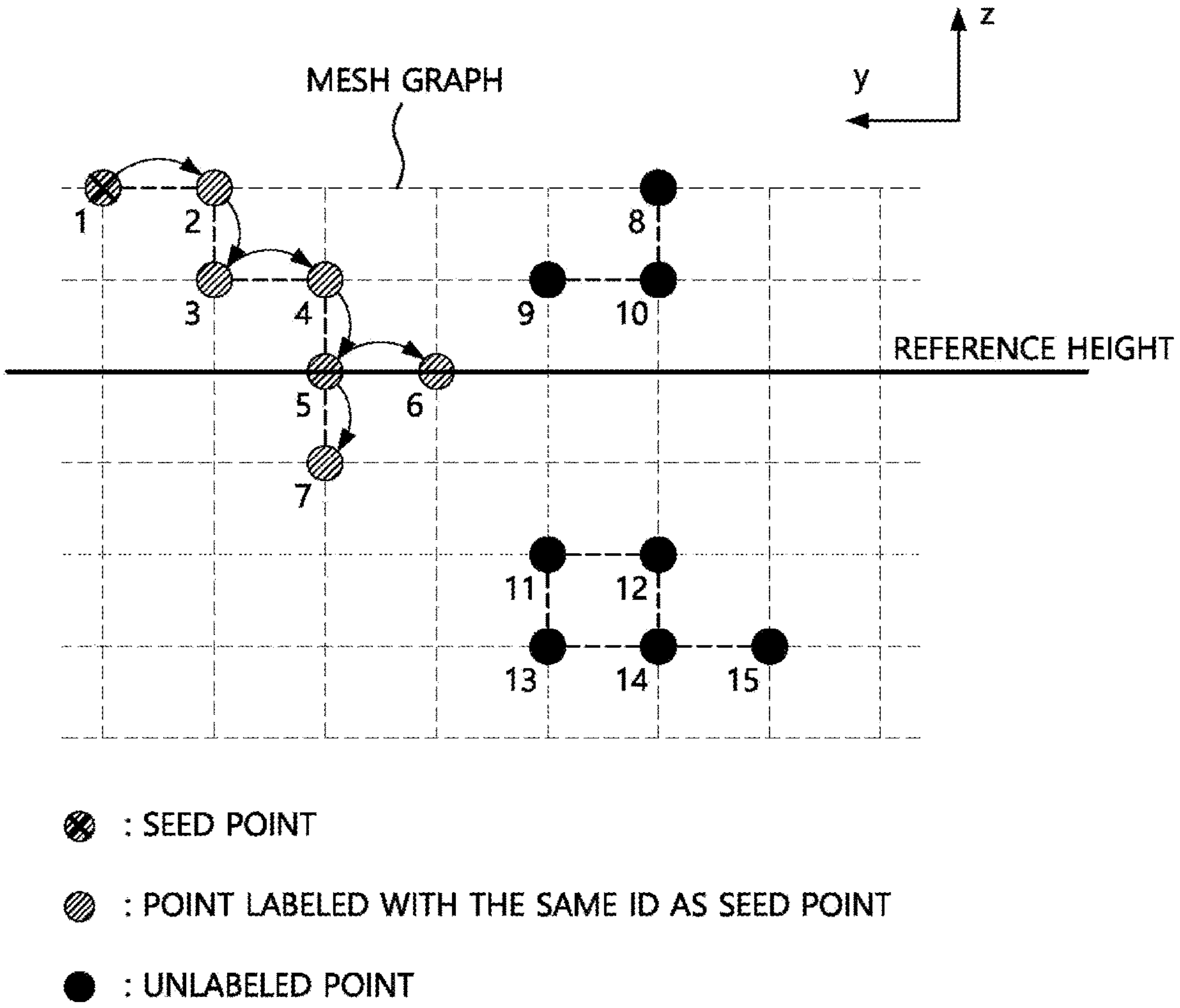
FIG. 7 is a diagram for explaining a method of segmenting overhead points at the step S200 of FIG. 4.

FIG. 7 is a diagram for explaining a method of segmenting overhead points at the step S200 of FIG. 4. According to the embodiment of FIG. 7, overhead points may be segmented and labeled in a region growing-based labeling method on the basis of a mesh graph generated through connectivity checking.

Referring to FIG. 7, the region growing-based labeling method is a method of labeling an ID by selecting an arbitrary point among points constituting a mesh graph as a seed point, growing a region by sequentially connecting the seed point and adjacent points, and labeling all connected points with the same ID as the seed point.

For example, when a point 1 is selected as a seed point, a point 2 adjacent to the point 1, a point 3 adjacent to the point 2, a point 4 adjacent to the point 3, a point 5 adjacent to the point 4 and a point 6 and a point 7 adjacent to the point 5 may be connected. Since there are no points adjacent to the point 6 and the point 7 which are last connected, region growing is ended. Thereafter, the same ID is labeled for the points 1 to 7. In the same way, points 8 to 10 may be connected to be assigned the same ID, and points 11 to 15 may be connected to be assigned with the same ID.

A seed point existing above a reference height (th_z_meter) for determining an overhead object is assigned with an ID meaning an overhead object. Accordingly, all points having the same ID as the seed point which is assigned with an ID meaning an overhead object may be segmented as overhead points generated by the overhead object. In the present embodiment, by exemplifying a road traffic sign as an overhead object, the reference height (th_z_meter) may be set to 4 m as the installation position of the road traffic sign. As the reference height (th_z_meter), various values may be set according to the characteristics of an overhead object to be recognized.

Although, among the points 1 to 7, the point 7 exists at a position lower than the reference height (th_z_meter), since the point 1 as the seed point exists above the reference height (th_z_meter), the point 7 may be labeled as the point of an overhead object. The reason why even the point 7 existing at a position lower than the reference height (th_z_meter) is labeled as the point of an overhead object resides in that, because an overhead object (a road traffic sign) may exist even at a position equal to or lower than 4 m due to the curvature of a road, it is intended to increase recognition performance for an overhead object and to utilize thereafter the point 7 even in the process of mitigating the influence of crosstalk.

As described above, by segmenting overhead points on the basis of a mesh graph, corresponding information may be labeled.

Figure 8:
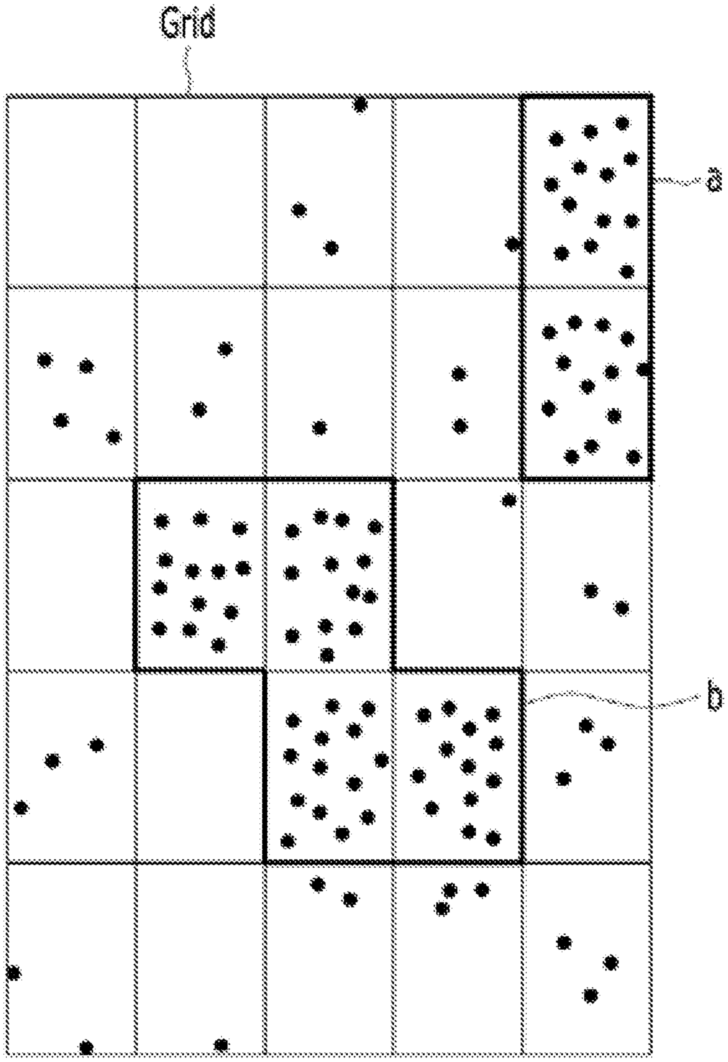
FIG. 8 is a diagram for explaining a method of clustering grounded points at step S300 of FIG. 4.

FIG. 8 is a diagram for explaining a method of clustering grounded points at the step S300 of FIG. 4, exemplifying a case where a grounded cluster a and a grounded cluster b are generated.

An embodiment may apply a clustering method on the basis of a mesh graph connection relationship for a region of overhead points, and may apply a grid-based clustering method for the remaining region including grounded points.

Referring to FIG. 8, the grid-based clustering method generates a grid map for a point cloud, and outputs the generated grid map to a labeling section. For example, a grid map generating section may generate a two-dimensional (2D) grid map, and may label each grid as a cluster according to the point distribution state of the corresponding grid. In addition, the separation distance between points positioned in different grids may be compared with a predetermined grid threshold, and, according to a comparison result, the two grids may be labeled by being included in the same cluster.

As described above, grounded points detected from an object which is attached to the ground or is determined to be attached to the ground are clustered in the grid-based clustering method to generate a grounded cluster.

Figure 9:
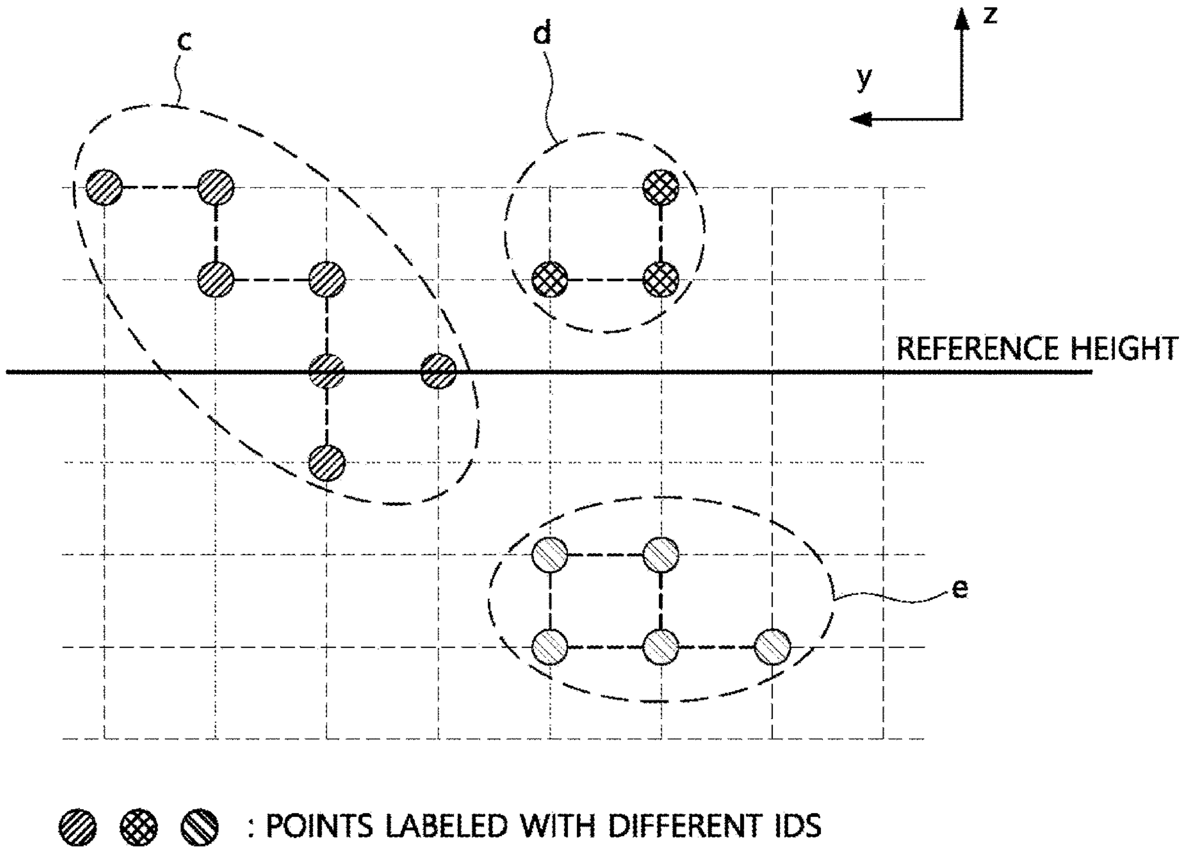
FIG. 9 is a diagram for explaining a method of clustering overhead points at step S400 of FIG. 4.

FIG. 9 is a diagram for explaining a method of clustering overhead points at the step S400 of FIG. 4.

Referring to FIG. 9, among points assigned with IDs in the region growing-based labeling method in a mesh graph, points having the same ID may be grouped together. When points having the same ID are grouped together, clusters c, d and e are generated.

The cluster c and the cluster d as clusters whose seed points exist above the reference height (th_z_meter) are processed as overhead object clusters.

Since the seed point of the cluster e cannot exist above the reference height (th_z_meter), the cluster e is not used.

Figure 10:
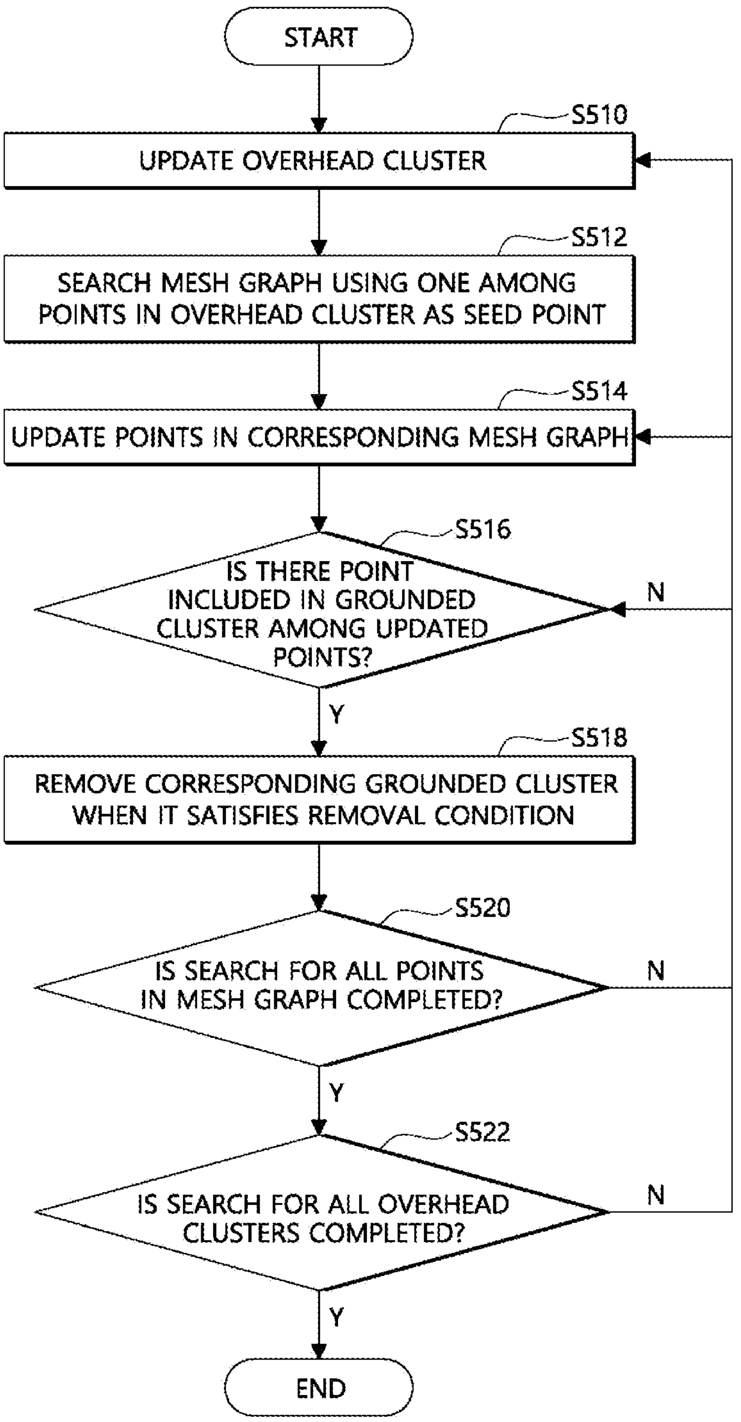
FIG. 10 is a flowchart of a method of removing a grounded cluster generated by a crosstalk effect that may be an exemplary method of removing a crosstalk effect at step S500 of FIG. 4.

FIGS. 10 to 13 are diagrams for explaining a method of removing a crosstalk effect at the step S500 of FIG. 4. Referring to FIG. 11A, when recognizing road traffic signs P1, P2 and P3 installed in an overhead region S, even though an object does not actually exist below the road traffic signs P1, P2 and P3, points may be detected, and thus, crosstalk may occur in which a grounded cluster may be generated. FIG. 10 is a flowchart of a method of removing a grounded cluster generated by a crosstalk effect.

Figure 11A:
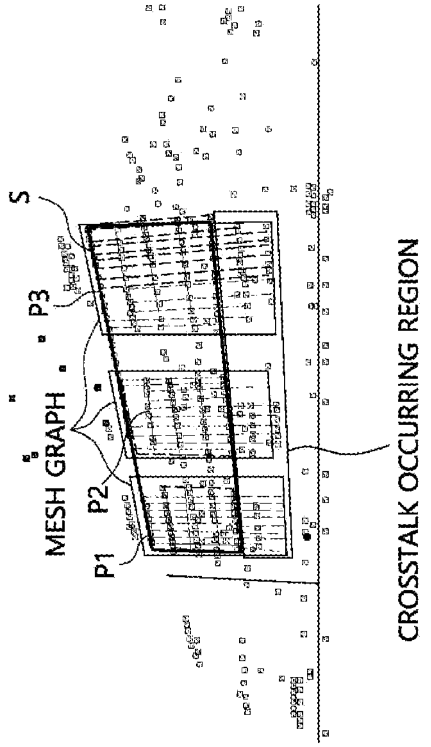
Figure 11B:
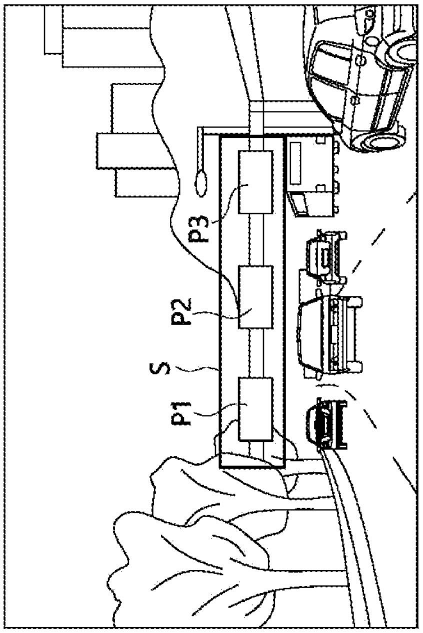

Referring to FIG. 10, an overhead cluster may be updated (S510), and a mesh graph may be searched by using one of points in the overhead cluster as a seed point (S512). When crosstalk occurs, as shown in FIG. 11B, the mesh graph may be generated by being extended to a region below the actual road traffic signs P1, P2 and P3 as shown in FIG. 11A.

Figure 12:
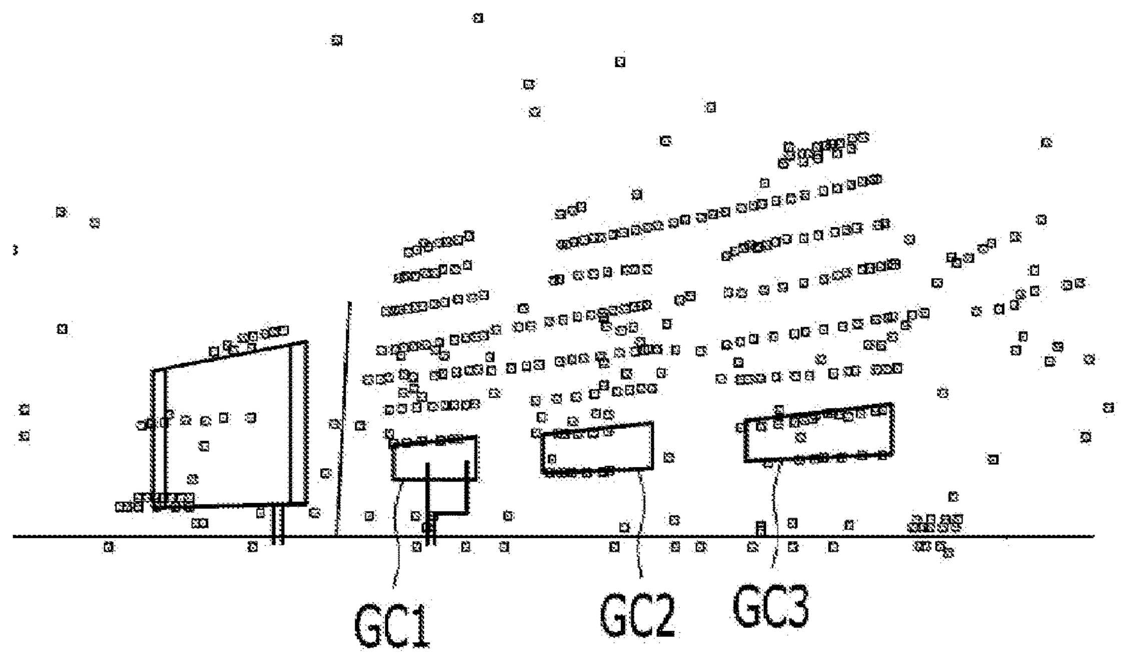
FIGS. 12 and 13 are diagrams for explaining a method of removing a crosstalk effect at step S500 of FIG. 4 including exemplary mesh graphs processed to detect or remove detected points from the crosstalk effect.

According to a result of searching the mesh graph, points in the corresponding mesh graph may be updated (S514). Accordingly, point data sensed in the crosstalk occurring region may be also updated in the mesh graph. Referring to FIG. 12, by the point data sensed due to the crosstalk, grounded clusters GC1, GC2 and GC3 may be generated in the region below the road traffic signs P1, P2 and P3.

After updating the points in the mesh graph, it may be checked whether there may be a point included in a grounded cluster among the updated points (S516).

When a grounded cluster may be checked among points in the overhead cluster, the corresponding grounded cluster may be removed by checking whether the corresponding grounded cluster satisfies a removal condition (S518). The grounded cluster removal condition may be set according to information on road traffic signs on a road being driven on, information on the structure and facilities of the road, actual driving data, and so forth. In the case of removing a grounded cluster, the corresponding grounded cluster exists in a region other than an occlusion region of a LiDAR free space, and a height in a Z direction may be equal to or smaller than a removal reference height. A LiDAR free space region means a region where a polygon may be drawn using a point closest to an origin among points existing within a free space resolution angle, and the occlusion region means a region other than a free space. The reason of, as such, determining once more whether to remove a grounded cluster, by using a removal condition, may be to minimize malfunction when a vehicle with a high height and a flat rear surface, such as a box truck, passes a road traffic sign.

Figure 13:
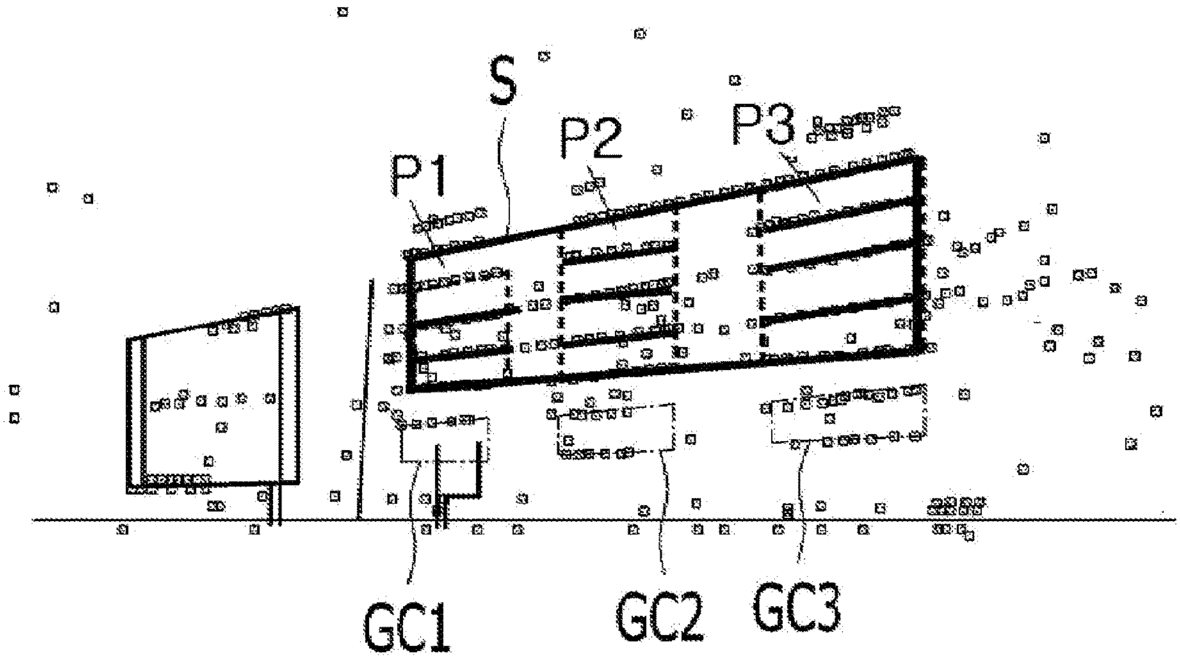

After performing the above-described process to search all points in the mesh graph (S520), all overhead clusters may be searched in such a way to search the mesh graph of a next overhead cluster (S522). When the search for all the overhead clusters may be completed, as shown in FIG. 13, the grounded clusters GC1, GC2 and GC3 erroneously generated in the region below the road traffic signs P1, P2 and P3 due to the crosstalk effect may be removed.

As may be apparent from the above description, in the vehicle LiDAR system and the object detecting method thereof according to the embodiments, when recognizing an overhead object with high reflectivity and a height from the ground equal to or larger than a reference, by removing grounded clusters determined to be erroneously generated due to a crosstalk effect, it may be possible to improve recognition accuracy for an overhead object such as a road sign.

In addition, in the vehicle LiDAR system and the object detecting method thereof according to the embodiments, by recognizing objects by clustering, in different ways, overhead points detected from an overhead object and grounded points detected from a grounded object attached to the ground or determined to be attached to the ground, object recognition performance may be maximized within limited system resources.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications may be possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An object detecting method of a vehicle LiDAR system, comprising:

generating an overhead cluster corresponding to an object whose location from a ground is equal to or larger than a reference height and a grounded cluster whose height from the ground is smaller than the reference height, in point cloud data obtained by sensing an object; and comparing point data included in the overhead cluster and point data included in the grounded cluster, and removing the grounded cluster based on a result of the comparing and a result of determining that an object corresponding to the corresponding grounded cluster does not exist.

2. The object detecting method according to claim 1, wherein the comparing of the point data included in the overhead cluster and the point data included in the grounded cluster and the removing of the grounded cluster upon determining that an object corresponding to the corresponding grounded cluster does not exist comprises:

determining, when point data included in the overhead cluster is also included in the grounded cluster, that an object corresponding to the corresponding grounded cluster does not exist.

3. The object detecting method according to claim 1, wherein the generating of the overhead cluster corresponding to an object whose height from the ground is equal to or larger than the reference height and the grounded cluster whose height from the ground is smaller than the reference height, in the point cloud data obtained by sensing the object, comprises:

generating a mesh graph based on a connectivity of points included in the point cloud data;

selecting an arbitrary point existing at a height equal to or larger than the reference height in the mesh graph, as a seed point;

sequentially connecting adjacent points on the mesh graph starting from the seed point; and assigning the same overhead point ID for points connected with the seed point.

4. The object detecting method according to claim 3, wherein the generating of the mesh graph based on the connectivity of the points included in the point cloud data comprises:

selecting one arbitrary seed point, and searching two points adjacent to the seed point in a vertical direction;

checking whether a distance of the two points adjacent in the vertical direction is equal to or smaller than a vertical reference distance; and determining, when the distance of the two points is equal to or smaller than the vertical reference distance, that the two points have vertical connectivity, and generating the mesh graph.

5. The object detecting method according to claim 3, wherein the generating of the mesh graph based on the connectivity of the points included in the point cloud data comprises:

selecting one arbitrary seed point, and searching two points adjacent to the seed point in a horizontal direction;

checking whether a distance of the two points adjacent in the horizontal direction is equal to or smaller than a horizontal reference distance;

determining, when the distance of the two points is equal to or smaller than the horizontal reference distance, whether the two points satisfy a convex angle; and determining, when the convex angle is satisfied, that the two points have horizontal connectivity, and generating the mesh graph.

6. The object detecting method according to claim 3, further comprising:

generating the overhead cluster by grouping points assigned the same overhead point ID.

7. The object detecting method according to claim 1, wherein the generating of the overhead cluster corresponding to an object whose height from the ground is equal to or larger than the reference height and the grounded cluster whose height from the ground is smaller than the reference height, in the point cloud data obtained by sensing the object, comprises:

setting a grid map for the point cloud data obtained by sensing the object;

grouping points according to a predetermined rule based on the grid map; and generating the grounded cluster according to a grouping result.

8. The object detecting method according to claim 1, wherein the comparing of the point data included in the overhead cluster and the point data included in the grounded cluster and the removing of the grounded cluster upon determining that an object corresponding to the corresponding grounded cluster does not exist comprises:

selecting one arbitrary point among overhead points included in the overhead cluster, as a seed point;

searching a mesh graph starting from the seed point;

updating points included in the searched mesh graph;

checking whether there is a point included in the grounded cluster, among the points; and determining, when there is a point included in the grounded cluster, that an object corresponding to the corresponding grounded cluster does not exist.

9. The object detecting method according to claim 8, further comprising:

determining whether the grounded cluster satisfies a preset removal condition; and removing, when the removal condition is satisfied, the corresponding grounded cluster.

10. The object detecting method according to claim 9, wherein the determining of whether the grounded cluster satisfies the preset removal condition comprises:

not removing and maintaining the grounded cluster when the corresponding grounded cluster exists within a preset valid range and exists at a position lower than a removal reference height.

11. The object detecting method according to claim 1, wherein the object whose height from the ground is equal to or larger than the reference height includes a road traffic sign.

12. A non-transitory computer-readable recording medium recorded with a program for executing an object detecting method of a vehicle LiDAR system, implementing:

a function of generating an overhead cluster corresponding to an object whose location from a ground is equal to or larger than a reference height and a grounded cluster whose height from the ground is smaller than the reference height, in point cloud data obtained by sensing an object; and a function of comparing point data included in the overhead cluster and point data included in the grounded cluster, and removing the grounded cluster based on a result of the comparing and a result of determining that an object corresponding to the corresponding grounded cluster does not exist.

13. A vehicle LiDAR system comprising:

a LiDAR sensor configured to sense an object, and output point cloud data; and a LiDAR signal processing device configured to:

generate, in point cloud data, an overhead cluster corresponding to an object whose height from a ground is equal to or larger than a reference height and a grounded cluster whose location from the ground is smaller than the reference height, compare point data included in the overhead cluster and point data included in the grounded cluster, and remove the grounded cluster based on a result of the comparing and a result of determining that an object corresponding to the corresponding grounded cluster does not exist.

14. The vehicle LiDAR system according to claim 13, wherein the LiDAR signal processing device comprises:

a segmenting section configured to generate a mesh graph based on a connectivity of points included in the point cloud data, select an arbitrary point existing at a height equal to or larger than the reference height in the mesh graph, as a seed point, sequentially connect adjacent points on the mesh graph starting from the seed point, and assign the same overhead point ID for points connected with the seed point;

a first clustering section configured to set a grid map for the point cloud data, and generate the grounded cluster according to a preset rule;

a second clustering section configured to group points assigned with the same overhead point ID, and generate the overhead cluster; and an error correcting section configured to compare the point data included in the overhead cluster and the point data included in the grounded cluster, and remove the grounded cluster upon determining that an object corresponding to the corresponding grounded cluster does not exist.

15. The vehicle LiDAR system according to claim 14, wherein the segmenting section selects one arbitrary seed point and searches two points adjacent to the seed point in a vertical direction, checks whether a distance of the two points adjacent in the vertical direction is equal to or smaller than a vertical reference distance, and determines, when the distance of the two points is equal to or smaller than the vertical reference distance, that the two points have vertical connectivity, and the segmenting section selects another arbitrary seed point and searches two points adjacent to the seed point in a horizontal direction, checks whether a distance of the two points adjacent in the horizontal direction is equal to or smaller than a horizontal reference distance, determines, when the distance of the two points is equal to or smaller than the horizontal reference distance, whether the two points satisfy a convex angle, and determines, when the convex angle is satisfied, that the two points have horizontal connectivity and generates the mesh graph.

16. The vehicle LiDAR system according to claim 14, wherein the error correcting section selects one arbitrary point among overhead points included in the overhead cluster, as a seed point, searches a mesh graph starting from the seed point, updates points included in the searched mesh graph, checks whether there is a point included in the grounded cluster, among the points, and determines, when there is a point included in the grounded cluster, that an object corresponding to the corresponding grounded cluster does not exist.

* * * * *